United States Patent
Guo et al.

(10) Patent No.: US 11,307,341 B2
(45) Date of Patent: Apr. 19, 2022

(54) METHOD FOR MANUFACTURING METAL WIRE GRID POLARIZER AND DISPLAY PANEL

(71) Applicant: BOE TECHNOLOGY GROUP CO., LTD., Beijing (CN)

(72) Inventors: Kang Guo, Beijing (CN); Yanhui Lu, Beijing (CN); Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 16/645,900

(22) PCT Filed: Oct. 23, 2019

(86) PCT No.: PCT/CN2019/112814
§ 371 (c)(1),
(2) Date: Mar. 10, 2020

(87) PCT Pub. No.: WO2020/098464
PCT Pub. Date: May 22, 2020

(65) Prior Publication Data
US 2021/0215867 A1      Jul. 15, 2021

(30) Foreign Application Priority Data

Nov. 16, 2018   (CN) .......................... 201811368479.9

(51) Int. Cl.
*G02B 6/136*      (2006.01)
*G02B 5/30*       (2006.01)

(52) U.S. Cl.
CPC ........... *G02B 5/3058* (2013.01); *G02B 6/136* (2013.01)

(58) Field of Classification Search
None
See application file for complete search history.

(56) References Cited

U.S. PATENT DOCUMENTS 9,050,752 B2 * 6/2015 Ootera .................. G03F 7/0002
9,573,345 B2 * 2/2017 Hon .................. B29C 45/14311
(Continued)

FOREIGN PATENT DOCUMENTS

CN    1616992      5/2005
CN    101126894    2/2008
(Continued)

OTHER PUBLICATIONS

International Search Report and Written Opinion dated Jan. 16, 2020 for PCT Patent Application No. PCT/CN2019/112814.
(Continued)

*Primary Examiner* — Shamim Ahmed
(74) *Attorney, Agent, or Firm* — Thomas | Horstemeyer, LLP

(57) ABSTRACT

A method for manufacturing a metal wire grid polarizer includes providing a template having grooves; forming a metal layer in the grooves, which comprises coating a metal thin film on a surface of the template on which the grooves are provided, and impressing the metal thin film so that the metal thin film is filled in the grooves to form a metal wire grid structure, the metal wire grid structure comprising the metal layer formed in the grooves and a cladding layer integrated with the metal layer and covering the surface of the template; and moving the metal layer to a substrate to manufacture the metal wire grid polarizer.

20 Claims, 5 Drawing Sheets

(56) References Cited

U.S. PATENT DOCUMENTS

| | | | | |
|---|---|---|---|---|
| 2008/0137188 A1* | 6/2008 | Sato | ............. | G02B 5/3058 |
| | | | | 359/485.05 |
| 2009/0027773 A1 | 1/2009 | Kawakami | | |
| 2014/0262444 A1* | 9/2014 | Gregoire | ............. | H05K 3/0014 |
| | | | | 174/251 |
| 2018/0339501 A1 | 11/2018 | Li | | |
| 2019/0064406 A1* | 2/2019 | Hou | ............. | G03F 7/0002 |

FOREIGN PATENT DOCUMENTS

| | | |
|---|---|---|
| CN | 101354458 | 1/2009 |
| CN | 102096134 A | 6/2011 |
| CN | 102470565 | 5/2012 |
| CN | 102574327 A | 7/2012 |
| CN | 102707378 A | 10/2012 |
| CN | 102759856 | 10/2012 |
| CN | 102096134 B | 11/2012 |
| CN | 102707378 B | 9/2013 |
| CN | 103760681 | 4/2014 |
| CN | 102574327 B | 9/2014 |
| CN | 105467499 | 4/2016 |
| CN | 106950636 | 7/2017 |
| CN | 107170675 | 9/2017 |
| CN | 108062001 | 5/2018 |
| CN | 108287383 | 7/2018 |
| CN | 109270620 | 1/2019 |
| JP | H1096808 | 4/1998 |
| JP | 2008299084 | 12/2008 |
| JP | 2010210839 | 9/2010 |
| JP | 2012168301 | 9/2012 |
| JP | WO2011049097 | 3/2013 |
| JP | 5737184 | 6/2015 |
| JP | 2016164618 | 9/2016 |
| KR | 20080040904 | 5/2008 |
| KR | 20120086687 | 8/2012 |
| KR | 101735133 | 5/2017 |
| KR | 101735217 | 5/2017 |
| TW | 201124259 | 7/2011 |
| TW | I501860 | 10/2015 |
| WO | 2011049097 | 4/2011 |

OTHER PUBLICATIONS

1st Office Action dated Nov. 4, 2019 for Chinese Patent Application No. 201811368479.9.

2nd Office Action dated Jun. 4, 2020 for Chinese Patent Application No. 201811368479.9.

Editor-in-Chief, "Research on the Development of Science and Technology in the Field of Micro-Nano Processing," Report on Advances in Mechanical Eng., China Assoc, for Science and Tech. (Apr. 30, 2014).

* cited by examiner

--Prior Art--

--Prior Art--

--Prior Art--

--Prior Art--

--Prior Art--

--Prior Art--

METHOD FOR MANUFACTURING METAL WIRE GRID POLARIZER AND DISPLAY PANEL

CROSS REFERENCE TO RELATED APPLICATIONS

This application is a § 371 national phase application based on International Application No. PCT/CN2019/112814, filed on Oct. 23, 2019, which claims the benefit of and priority to Chinese Patent Application No. 201811368479.9, filed on Nov. 16, 2018, the entire contents of which are incorporated herein by reference.

TECHNICAL FIELD

The present disclosure relates to the field of display technology and, more particularly, to a method for manufacturing a metal wire grid polarizer and a display panel.

BACKGROUND

Metal wire grid polarizer (WGP) is a new type of polarizer. It is very thin, light in weight, and highly integrated, and may be used in some new In-cell pol displays. However, manufacturing metal wire grid polarizers is difficult as it has a very long manufacturing cycle, complicated processes, and low efficiency.

It should be noted that information disclosed in BACKGROUND described above are provided only for acquiring a better understanding of the background of the present application and therefore may include information that is not current technology already known to those of ordinary skill in the art.

SUMMARY

In a first aspect of the present disclosure, there is provided a method for manufacturing a metal wire grid polarizer, including:
 providing a template having grooves;
 forming a metal layer in the grooves; and
 moving the metal layer to a substrate to manufacture the metal wire grid polarizer.

In an exemplary embodiment of the present disclosure, forming the metal layer in the grooves includes:
 coating a metal thin film on a surface of the template on which the grooves are provided; and
 impressing the metal thin film to form a metal wire grid structure, which includes the metal layer and a cladding layer being integrated with the metal layer and covering the surface of the template.

In an exemplary embodiment of the present disclosure, moving the metal layer to the substrate includes:
 providing the substrate on the cladding layer and bonding the metal wire grid structure to the substrate;
 separating the metal wire grid structure bonded to the substrate from the template; and
 etching the metal wire grid structure to etch away the cladding layer between the adjacent metal layers and expose a surface of the substrate, so as to manufacture the metal wire grid polarizer.

In an exemplary embodiment of the present disclosure, before providing the substrate on the cladding layer, the method further includes:
 thinning the cladding layer so that the cladding layer has a target thickness.

In an exemplary embodiment of the present disclosure, the target thickness is less than 30 nm.

In an exemplary embodiment of the present disclosure, coating the metal thin film on the surface of the template on which the grooves are provided includes:
 depositing a release layer on the surface of the template on which the grooves are provided; and
 coating the metal thin film on the release layer.

In an exemplary embodiment of the present disclosure, a material of the release layer includes a metal material or a fluorine-containing organic compound.

In an exemplary embodiment of the present disclosure, impressing the metal thin film includes:
 coating an impact-resistance layer on a surface of the metal thin film; and
 impressing the impact-resistance layer and the metal thin film by using an impressing device, so that the metal thin film is formed into the metal wire grid structure.

In an exemplary embodiment of the present disclosure, the impressing device is a laser.

In an exemplary embodiment of the present disclosure, a material of the impact-resistance layer includes graphite.

In an exemplary embodiment of the present disclosure, providing the substrate on the cladding layer and bonding the metal wire grid structure to the substrate includes:
 providing the substrate on the cladding layer and bonding the metal wire grid structure to the substrate by employing a bonding technology.

In an exemplary embodiment of the present disclosure, a material of the metal layer includes metallic aluminum or metallic silver.

In an exemplary embodiment of the present disclosure, the substrate is a silicon wafer or glass.

In a second aspect of the present disclosure, there is provided a display panel including the metal wire grid polarizer manufactured by using the method for manufacturing a metal wire grid polarizer according to any one of the above.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments consistent with the invention and, together with the description, serve to explain the principles of the invention. It is understood that the drawings in the following description only illustrate some of the embodiments of the present disclosure, and one of ordinary skill in this art could obtain other drawings based on these drawings without inventive work.

DETAILED DESCRIPTION

Figure 1:
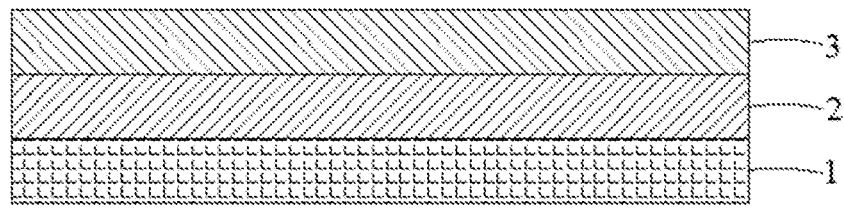
FIG. 1 is a diagram drawn after the completion of step S2 of a method for manufacturing a metal wire grid polarizer in the related art.

The exemplary embodiments will now be described more fully with reference to the accompanying drawings. However, the exemplary embodiments can be implemented in various forms and should not be understood as being limited to the examples set forth herein. Rather, these embodiments are provided so that this disclosure will be thorough and complete, and the concepts of exemplary embodiments will be fully conveyed to those skilled in the art. The same reference signs in the drawings denote the same or similar structures, and detailed descriptions thereof will be omitted.

Although the relationship of one component relative to another component is described in terms having opposite meanings such as "up" and "down" in this specification, the terms are used for convenience only in this specification, for example, "in the direction illustrated in the drawings". It can be understood that if a device denoted in the drawings is turned upside down, a component described as "above" something will become a component described as "under" something. When a structure is described as "above" another structure, it probably means that the structure is integrally formed on another structure, or the structure is "directly" disposed on another structure, or the structure is "indirectly" disposed on another structure through an additional structure.

Words such as "one", "an/a", "the", and "said" used herein indicate the presence of one or more elements, components, parts, or the like. Terms "including" and "having" used herein have an inclusive meaning that there may be other elements, components, parts, or the like in addition to the listed elements, components, parts, or the like. Terms, such as "first" and "second", used herein are only labels or markers, and they do not limit the number of objects modified after them.

In the related art, manufacturing a metal wire grid polarizer is mainly characterized by coating an impressing adhesive on a metal thin film for impression and then etching to form a nano-level wire grid structure through multiple etching processes. However, the etched wire grid structure manufactured by the method has poor appearance uniformity, and is prone to collapse, thereby leading to a low degree of polarization and poor transmission of a metal wire grid polarizer.

Figure 2:
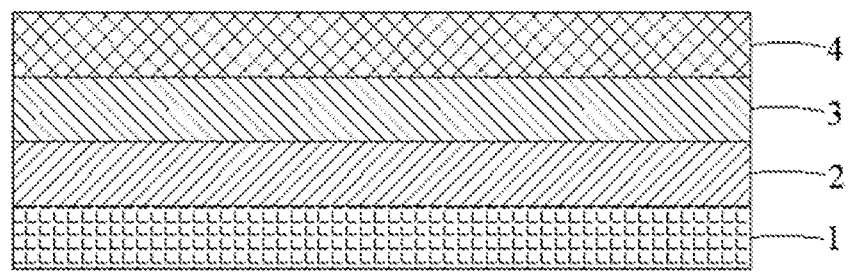
FIG. 2 is a diagram drawn after the completion of step S3 of a method for manufacturing a metal wire grid polarizer in the related art.
Figure 3:
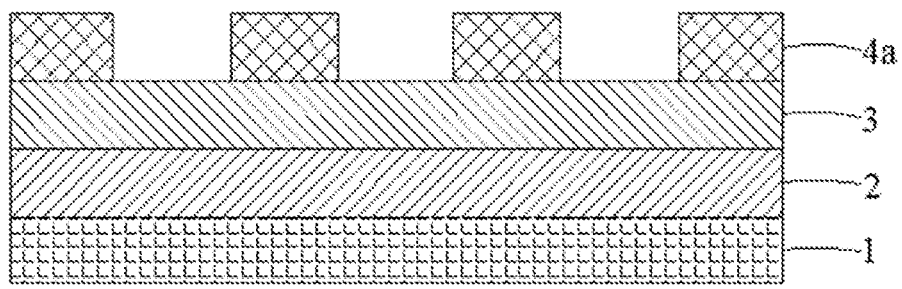
FIG. 3 is a diagram drawn after the completion of step S4 of a method for manufacturing a metal wire grid polarizer in the related art.
Figure 4:
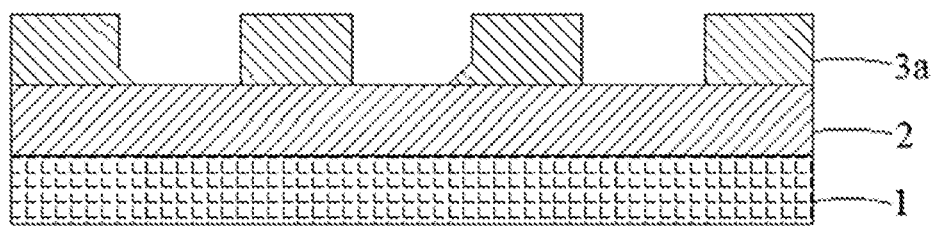
FIG. 4 is a diagram drawn after the completion of step S5 of a method for manufacturing a metal wire grid polarizer in the related art.
Figure 5:
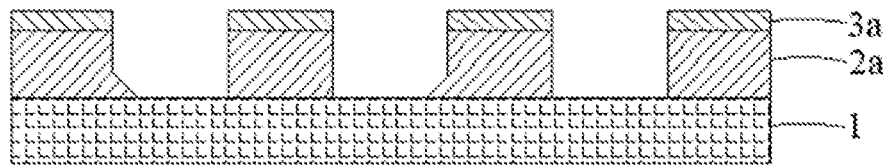
FIG. 5 is a diagram drawn after the completion of step S6 of a method for manufacturing a metal wire grid polarizer in the related art.
Figure 6:
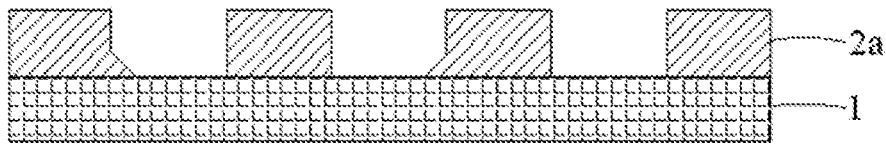
FIG. 6 is a diagram drawn after the completion of step S2 of a method for manufacturing a metal wire grid polarizer in the related art.

In the related art, manufacturing a metal wire grid polarizer includes the following steps. In step S1, a substrate 1 is provided. In step S2, a metallic aluminum layer 2 and a silicon dioxide layer 3 are sequentially deposited on the substrate 1. FIG. 1 is a diagram drawn after the completion of step S2 of the method for manufacturing a metal wire grid polarizer in the related art. In step S3, an impressing adhesive 4 is coated on the silicon dioxide layer 3. FIG. 2 is a diagram drawn after the completion of step S3 of the method for manufacturing a metal wire grid polarizer in the related art. In step S4, the impressing adhesive 4 is nano-imprinted to form an impressing adhesive pattern 4a. FIG. 3 is a diagram drawn after the completion of step S4 of the method for manufacturing a metal wire grid polarizer in the related art. In step S5, the silicon dioxide layer 3 is etched by using the impressing adhesive pattern 4a as an etching mask to form a silicon dioxide pattern 3a. FIG. 4 is a diagram drawn after the completion of step S5 of the method for manufacturing a metal wire grid polarizer in the related art. In step S6, the metallic aluminum layer 2 is etched by using the silicon dioxide pattern 3a as an etching mask to form an intermediate pattern, which usually includes a metal wire grid structure 2a and the silicon dioxide pattern 3a left over on the metal wire grid structure 2a. FIG. 5 is a diagram drawn after the completion of step S6 of the method for manufacturing a metal wire grid polarizer in the related art. In step S7, the intermediate pattern is etched to remove the silicon dioxide pattern 3a left over on the metal wire grid structure 2a, thus a metal wire grid polarizer is manufactured. FIG. 6 is a diagram drawn after the completion of step S7 of the method for manufacturing a metal wire grid polarizer in the related art.

It can be understood from the above-described processes that the method for manufacturing a metal wire grid polarizer is mainly characterized by coating the impressing adhesive 4 on the metallic aluminum layer 2 for impression and then etching to form the nano-level metal wire grid structure 2a through multiple etching processes. However, as shown in FIGS. 4 to 6, it is easy to produce residues and cause non-uniform etching during the etching processes, thereby the metal wire grid structure 2a formed by etching has poor verticality and uniformity. As shown in FIG. 6, it easily leads to a low degree of polarization and poor transmittance of the metal wire grid polarizer. Furthermore, the manufacturing method has a long manufacturing cycle, requires complicated processes to be performed, and provides low efficiency.

Figure 7:
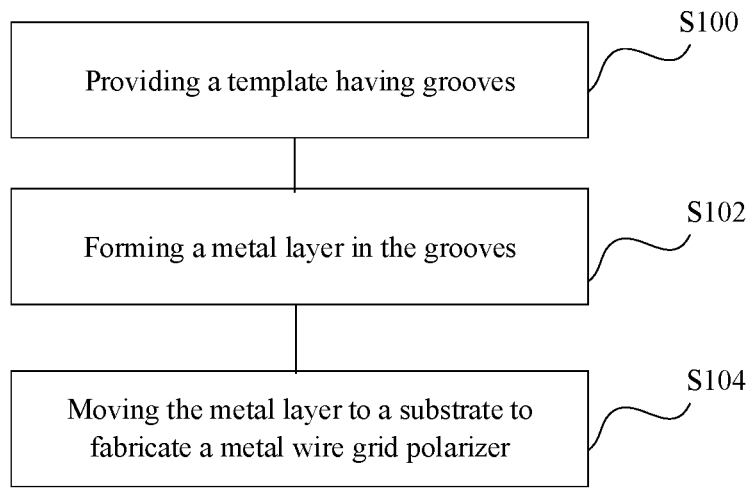
FIG. 7 is a flowchart of a method for manufacturing a metal wire grid polarizer in an embodiment of the present disclosure.
Figure 8:
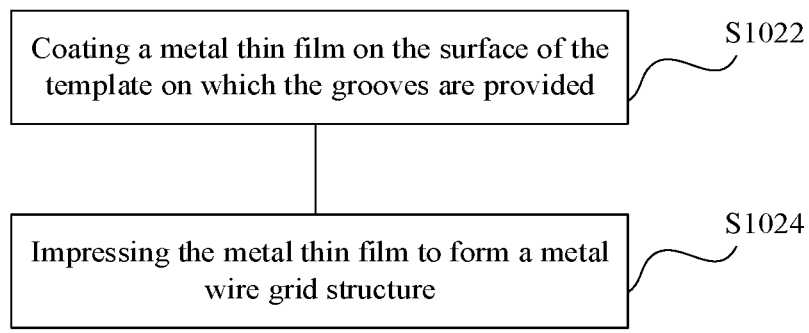
FIG. 8 is a flowchart of step S102 in FIG. 7.
Figure 9:
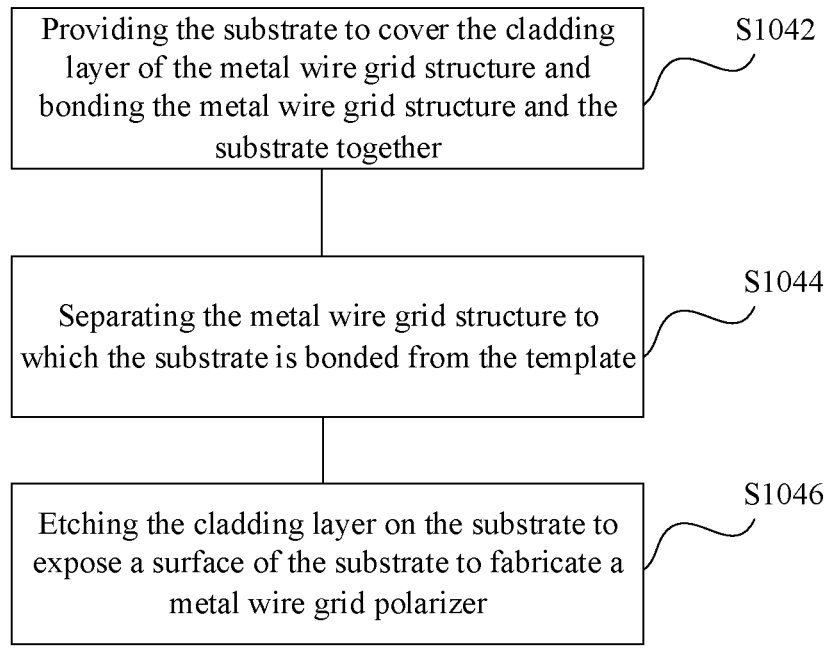
FIG. 9 is a flowchart of step S104 in FIG. 7.

In order to solve the above-described technical problem, embodiments of the present disclosure provide a method for manufacturing a metal wire grid polarizer. The metal wire grid polarizer may be used in a display panel, which may be a liquid crystal display panel or an OLED (Organic Light- Emitting Diode) display panel. As shown in FIG. 7, the method for manufacturing a metal wire grid polarizer in this embodiment may include the following steps.

In step S100, a template having grooves is provided.

In step S102, a metal layer is formed in the grooves.

In step S104, the metal layer is moved to a substrate to fabricate a metal wire grid polarizer.

In the embodiment, the metal layer is first formed in the grooves of the template and then is moved to the substrate to fabricate the metal wire grid polarizer. Compared with the manufacturing method of coating the impressing adhesive on the metal film for impression and then etching to form the nano-level wire grid structure through multiple etching processes mentioned in the related art, this method reduces the number of etching processes, thus reducing the possibility of producing residues and causing non-uniform etching. It also guarantees the verticality and uniformity of the metal wire grid structure and alleviates the problem of a low degree of polarization and poor transmittance of the metal wire grid polarizer. The process yield of the metal wire grid polarizer is thus improved. In addition, this embodiment simplifies the manufacturing processes of the metal wire grid polarizer, thereby shortening the manufacturing time and improving the manufacturing efficiency.

The method for manufacturing a metal wire grid polarizer in the embodiment will be described in detail below with reference to the accompanying drawings.

Figure 12:
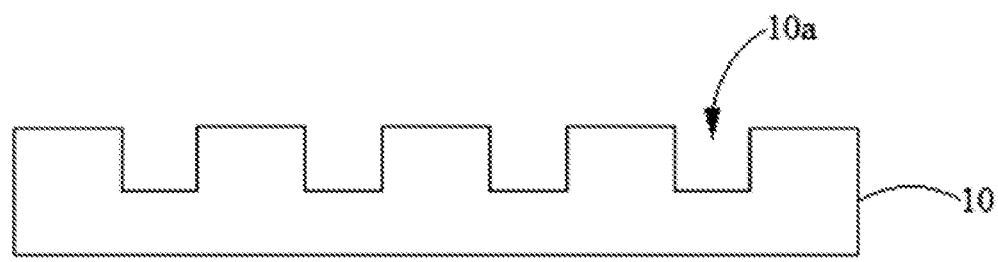
FIG. 12 is a diagram drawn after the completion of step S100 of a method for manufacturing a metal wire grid polarizer in an embodiment of the present disclosure.

As shown in FIGS. 7 and 12, in step S100, a template 10 having grooves 10a is provided.

For example, the template 10 may be made of a silicon dioxide, a polyethylene, but it is not limited thereto. The template 10 has a plurality of spaced-apart grooves 10a arranged on its surface. The grooves 10a may be formed by hot pressing, but is not limited thereto. They may also be formed through an etching process.

As shown in FIGS. 7, 8, 14, and 15, in step S102, a metal layer 11a is formed in the grooves 10a, which may specifically include the following steps.

In step S1022, a metal thin film 11 is coated on the surface of the template 10 on which the grooves 10a are provided.

In step S1024, the metal thin film 11 is impressed to form a metal wire grid structure. The metal wire grid structure includes the aforementioned metal layer 11a formed in the grooves 10a and a cladding layer 11b integrated with the metal layer 11a and covering the surface of the template 10.

In the embodiment, a portion of the metal thin film 11 is filled into the grooves 10a by using an imprint technology to form the metal layer 11a so that the manufacturing difficulty and cost of the metal layer 11a can be reduced.

As shown in FIGS. 7, 9, and 16-19, in step S104, the metal layer 11a is moved to a substrate 12 to manufacture a metal wire grid polarizer, which may specifically include the following steps.

In step S1042, the substrate 12 is provided to cover the cladding layer 11b of the metal wire grid structure and the metal wire grid structure and the substrate 12 are bonded together.

In step S1044, the metal wire grid structure to which the substrate 12 is bonded is separated from the template 10.

In step S1046, the cladding layer 11b on the substrate 12 is etched to expose a surface of the substrate 12 to fabricate a metal wire grid polarizer.

It can be understood from the foregoing that, in this embodiment, the metal thin film 11 is disposed on the template 10 having the grooves 10a. The metal thin film 11 is impressed to form the metal wire grid structure. The substrate 12 is provided to cover the cladding layer 11b of the metal wire grid structure and the metal wire grid structure is moved to the substrate 12. The metal wire grid structure moved to the substrate 12 is separated from the template 10. The cladding layer 11b on the substrate 12 is etched to expose the surface of the substrate 12. Thus, the metal wire grid polarizer is manufactured.

It should be noted that the metal wire grid polarizer may be manufactured by using the foregoing embodiments. Alternatively, a metal material may be directly filled into grooves of a template by using a physical sputtering process to form a metal layer. Then, the metal layer is bonded to a substrate. Finally, the metal layer bonded to the substrate is separated from the template, that is, the metal layer is moved to the substrate. Thus, a metal wire grid polarizer is fabricated.

For example, as mentioned above, in step S1022, the metal thin film 11 is coated on the surface of the template 10 on which the grooves 10a are provided. The metal thin film 11 may have a thickness ranging from several hundred nanometers to several micrometers, but it is not limited thereto. In addition, the metal thin film 11 may include metallic aluminum or metallic silver. Namely, the aforementioned metal layer 11a and the cladding layer 11b may include metallic aluminum or metallic silver, but it is not limited thereto. They may include other metal materials, such as a gold material or a nickel material having excellent ductility.

The metal thin film 11 in the embodiment is made of a metal material having good ductility, which may prevent the metal thin film 11 from being broken during the subsequent impression, thereby guaranteeing the integrity of the metal thin film 11.

Figure 10:
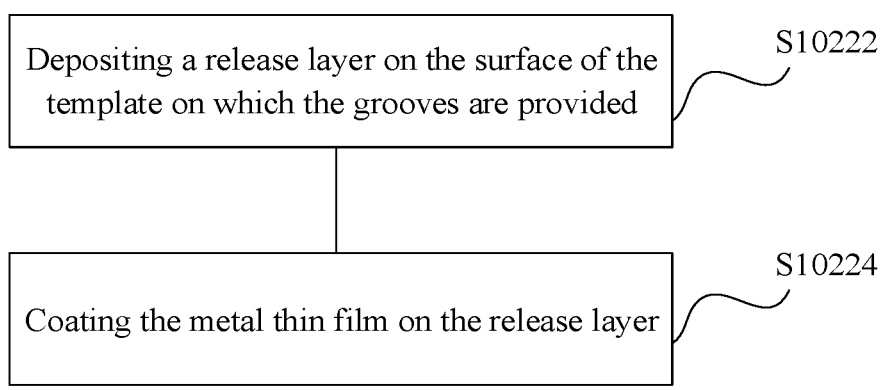
FIG. 10 is a flowchart of step S1022 in FIG. 8.

As shown in FIG. 10, step S1022 may specifically include the following steps.

Figure 13:
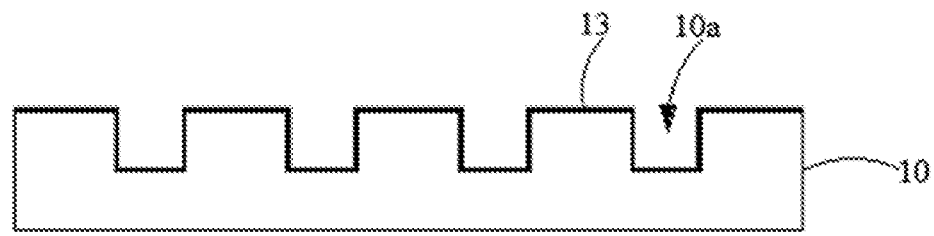
FIG. 13 is a diagram drawn after the completion of step S10222 of a method for manufacturing a metal wire grid polarizer in an embodiment of the present disclosure.

In step S10222, a release layer 13 is deposited on the surface of the template 10 on which the grooves 10a are provided, as shown in FIG. 13.

Figure 14:
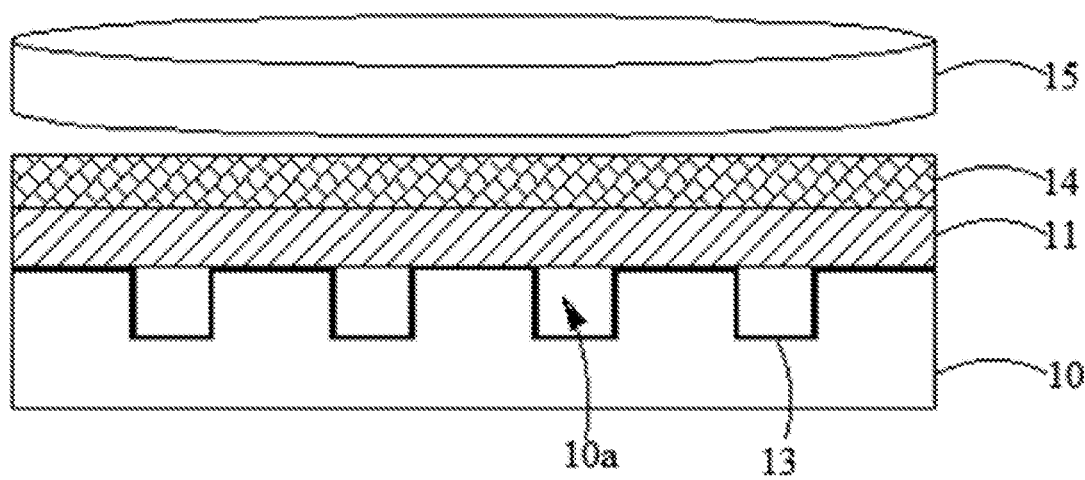
FIG. 14 is a diagram drawn upon the carrying out of step S10244 of a method for manufacturing a metal wire grid polarizer in an embodiment of the present disclosure.

In step S10224, the metal thin film 11 is coated on the release layer 13, as shown in FIG. 14.

In the embodiment, the release layer 13 is firstly deposited on the surface of the template 10 on which the grooves 10a are provided and then the metal thin film 11 is coated on the release film 13, which may alleviate the adhesion of the metal thin film 11 to the template 10 during the subsequent embossing, making it convenient for subsequent demolding.

For example, a material of the release layer 13 may include a metal material or a fluorine-containing organic compound. Namely, the release layer 13 may be made of a metal material or a fluorine-containing organic compound, which is not limited thereto. It may also be made of other anti-adhesive materials. It should be noted that the metal material may be metallic silver, but it is not limited thereto.

In addition, in order to alleviate the adhesion of the metal thin film 11 to the template 10 in the subsequent impression, the template 10 may be directly made of an anti-adhesive material, so that the step of depositing the release layer 13 on the template 10 can be omitted. Thus, the manufacturing processes of the metal wire grid polarizer are further simplified, the manufacturing time is shortened and the manufacturing efficiency is improved.

In step S1024, the metal thin film 11 is impressed to form a metal wire grid structure. The metal wire grid structure includes the aforementioned metal layer 11a formed in the grooves 10a and a cladding layer 11b integrated with the metal layer 11a and covering the surface of the template 10.

Figure 15:
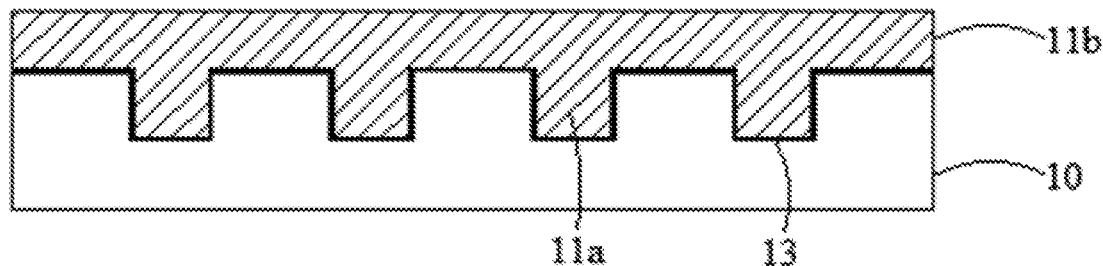
FIG. 15 is a diagram drawn after the completion of step S10244 of a method for manufacturing a metal wire grid polarizer in an embodiment of the present disclosure.

Specifically, as shown in FIG. 14, the metal thin film 11 may be pressed by the impressing device 15, and may be brought into a molten state by the impressing device 15 when it is pressed by the impressing device 15. Thus, the metal thin film 11 can flow into the grooves 10a due to its fluidity so as to form the metal layer 11a amid the pressing of the impressing device 15. In addition, after the pressing process, a cladding layer 11b of a certain thickness will remain to cover the surface of the template 10, as shown in FIG. 15. It should be noted that the metal layer 11a and the cladding layer 11b are formed into an integrated structure, which may be referred to as a metal wire grid structure.

For example, the impressing device 15 may be a laser. A laser beam emitted from the laser may bring the metal thin film 11 into a molten state, so that the metal thin film 11 flows into the grooves 10a to form the metal layer 11a.

In the embodiment, time taken for melting the metal thin film 11 may be shortened by using the laser as the impressing device 15, thereby improving the manufacturing efficiency.

Figure 11:
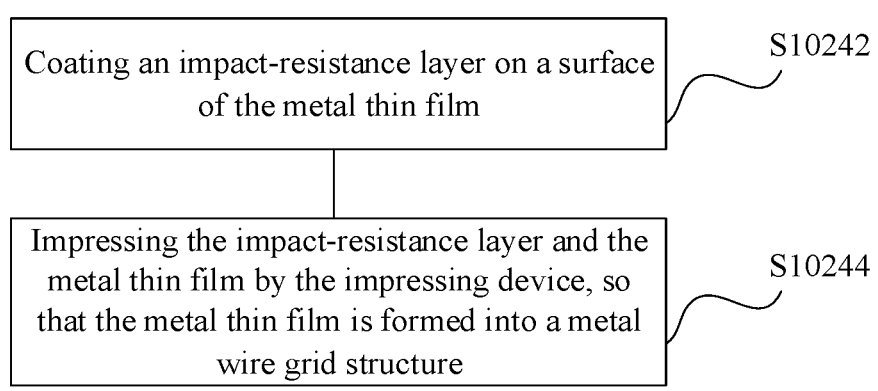
FIG. 11 is a flowchart of step S1024 in FIG. 8.

As shown in FIG. 11, step S1024 may include the following steps.

In step S10242, an impact-resistance layer 14 is coated on a surface of the metal thin film 11, as shown in FIG. 14.

In step S10244, the impact-resistance layer 14 and the metal thin film 11 are impressed by the impressing device 15, so that the metal thin film 11 is formed into a metal wire grid structure, as shown in FIG. 15.

In the embodiment, the impact-resistance layer 14 is first coated on the surface of the metal thin film 11 and then the impact-resistance layer 14 and the metal thin film 11 are sequentially impressed by the impressing device 15 so that the metal thin film 11 is formed into a metal wire grid structure. This may avoid the situation where the metal thin film 11 is directly impressed by the impressing device 15 to deteriorate the characteristics of the metal thin film 11, thereby improving the process yield of the metal wire grid structure. The impact-resistance layer 14 is removed by conventional lift-off processes after the impressing is completed.

For example, a material of the impact-resistance layer 14 may include graphite. That is to say, the impact-resistance layer 14 may be made of graphite, which is, however, not limited thereto. It may also be made of other impact-resistance materials.

Figure 17:
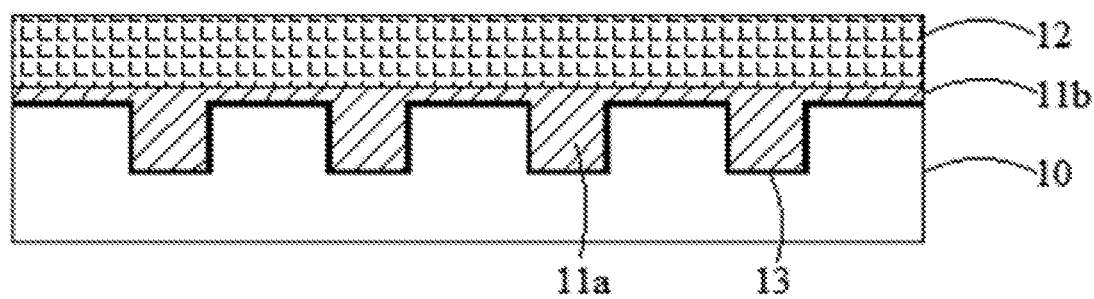
FIG. 17 is a diagram drawn after the completion of step S1042 of a method for manufacturing a metal wire grid polarizer in an embodiment of the present disclosure.

In step S1042, the substrate 12 is provided to cover the cladding layer 11b of the metal wire grid structure and the metal wire grid structure and the substrate 12 are bonded together, as shown in FIG. 17.

The substrate 12 may be a silicon wafer or glass, which is, however, not limited thereto. It also may be made of other materials.

For example, the substrate 12 may be first coated on the cladding layer 11b and then the metal wire grid structure is moved to the substrate 12 by a bonding technology. Thus, the bonding stability of the metal wire grid structure and the substrate 12 may be improved, which is convenient for the whole demolding. The metal wire grid structure may be moved to the substrate 12 by using a bonding technology such as eutectic bonding, electrostatic bonding, or direct bonding.

It should be noted that the metal wire grid structure and the substrate 12 may be bonded together not only by the bonding technology, but also by an adhesion technique according to specific situations.

Figure 18:
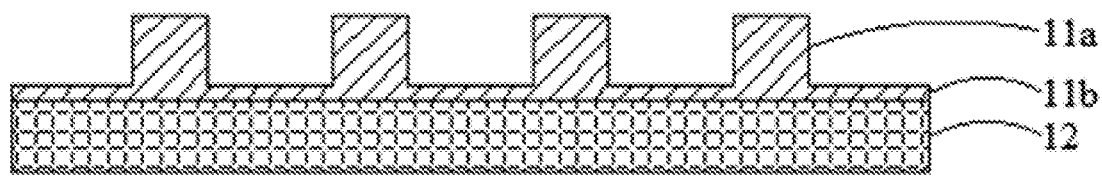
FIG. 18 is a diagram drawn after the completion of step S1044 of a method for manufacturing a metal wire grid polarizer in an embodiment of the present disclosure.

In step S1044, the metal wire grid structure to which the substrate 12 is bonded is separated from the template 10. Namely, the demolding process of the metal wire grid structure and the substrate 12 is completed. At this time, the resulted structure may be referred to as an intermediate structure, which includes the substrate 12 and the metal wire grid structure formed on the substrate 12, as shown in FIG. 18.

Figure 19:
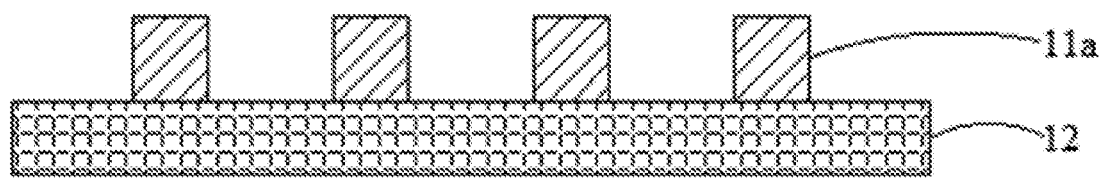
FIG. 19 is a diagram drawn after the completion of step S1046 of a method for manufacturing a metal wire grid polarizer in an embodiment of the present disclosure.

In step S1046, the metal wire grid structure is etched to etch away the cladding layer 11b between the adjacent metal layers 11a and expose the surface of the substrate 12, thus the metal wire grid polarizer is fabricated, as shown in FIG. 19.

For example, the metal wire grid structure is etched by using a dry etching technique to etch away a portion of the cladding layer 11b between the adjacent metal layers 11a and then exposure the surface of the substrate 12 corresponding to that portion. Thus, the metal wire grid polarizer is fabricated.

In an exemplary embodiment of the present disclosure, before coating the substrate 12 on the cladding layer 11b, the method further includes the following steps.

Figure 16:
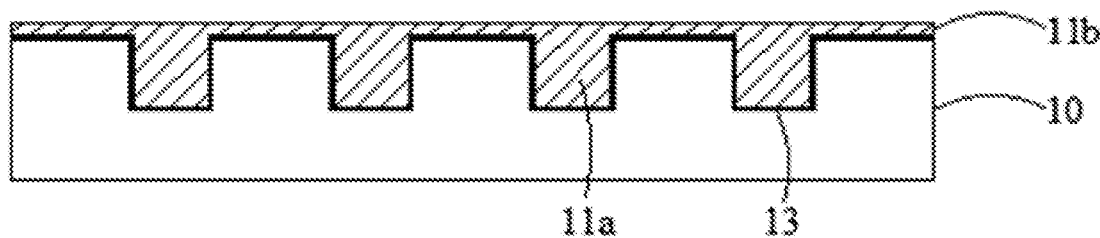
FIG. 16 is a diagram drawn after the completion of step S1041 of a method for manufacturing a metal wire grid polarizer in an embodiment of the present disclosure.

In step S1041, the cladding layer 11b is thinned so that the cladding layer 11b will have a target thickness, as shown in FIG. 16. Thus, it is guaranteed that the thickness of the metal wire grid structure meets the requirements. The cladding layer 11b may be thinned by a chemical mechanical polishing (CMP) technology, or other approaches such as dry polishing or electrochemical etching. In addition, the thickness uniformity of the cladding layer 11b may be guaranteed by thinning the cladding layer 11b, so that over-etching or incomplete etching during the subsequent etching of the cladding layer 11b may be avoided, thus improving the process yield of the metal wire grid polarizer.

Optionally, the aforementioned target thickness is less than 30 nm, which may reduce the difficulty of subsequent etching and improve the etching uniformity.

In addition, an embodiment of the present disclosure further provides a display panel including the metal wire grid polarizer manufactured by employing the method for manufacturing a metal wire grid polarizer in any of the above-described embodiments. The display panel may be a liquid crystal display panel or an OLED display panel. The display panel may be used in displays, such as mobile phones and computers.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

What is claimed is:

1. A method for manufacturing a metal wire grid polarizer, comprising:
providing a template having grooves;
forming a metal layer in the grooves by coating a metal thin film on a surface of the template on which the grooves are provided and impressing the metal thin film so that the metal thin film is filled in the grooves to form a metal wire grid structure, the metal wire grid structure comprising the metal layer formed in the grooves and a cladding layer integrated with the metal layer and covering the surface of the template; and
moving the metal layer to a substrate to manufacture the metal wire grid polarizer;
wherein moving the metal layer to the substrate comprises:

providing the substrate on the cladding layer and bonding the metal wire grid structure to the substrate;

separating the metal wire grid structure bonded to the substrate from the template; and etching the metal wire grid structure to etch away the cladding layer between the adjacent metal layers and expose a surface of the substrate, to obtain the metal wire grid polarizer.

2. The method for manufacturing the metal wire grid polarizer according to claim 1, wherein impressing the metal thin film comprises:

coating an impact-resistance layer on a surface of the metal thin film; and impressing the impact-resistance layer and the metal thin film by using an impressing device so that the metal thin film is filled in the grooves and is formed into the metal wire grid structure.

3. The method for manufacturing the metal wire grid polarizer according to claim 1, wherein, before providing the substrate on the cladding layer, the method further comprises: thinning the cladding layer to make the cladding layer have a target thickness.

4. The method for manufacturing the metal wire grid polarizer according to claim 3, wherein the target thickness is less than 30 nm.

5. The method for manufacturing the metal wire grid polarizer according to claim 2, wherein coating the metal thin film on the surface of the template on which the grooves are provided comprises:

depositing a release layer on the surface of the template on which the grooves are provided; and coating the metal thin film on the release layer.

6. The method for manufacturing the metal wire grid polarizer according to claim 5, wherein a material of the release layer comprises a metal material or a fluorine-containing organic compound.

7. The method for manufacturing the metal wire grid polarizer according to claim 1, wherein the impressing device is a laser.

8. The method for manufacturing the metal wire grid polarizer according to claim 2, wherein a material of the impact-resistance layer comprises graphite.

9. The method for manufacturing the metal wire grid polarizer according to claim 1, wherein providing the substrate on the cladding layer and bonding the metal wire grid structure to the substrate comprises:

providing the substrate on the cladding layer and bonding the metal wire grid structure to the substrate by employing a bonding technology.

10. The method for manufacturing the metal wire grid polarizer according to claim 1, wherein a material of the metal layer comprises metallic aluminum or metallic silver.

11. The method for manufacturing the metal wire grid polarizer according to claim 1, wherein the substrate is a silicon wafer or glass.

12. The method for manufacturing the metal wire grid polarizer according to claim 3, wherein coating the metal thin film on the surface of the template on which the grooves are provided comprises:

depositing a release layer on the surface of the template on which the grooves are provided; and coating the metal thin film on the release layer.

13. The method for manufacturing the metal wire grid polarizer according to claim 4, wherein coating the metal thin film on the surface of the template on which the grooves are provided comprises:

depositing a release layer on the surface of the template on which the grooves are provided; and coating the metal thin film on the release layer.

14. A display panel comprising a metal wire grid polarizer manufactured using a method for manufacturing the metal wire grid polarizer, the method comprising:

providing a template having grooves;

forming a metal layer in the grooves by coating a metal thin film on a surface of the template on which the grooves are provided and impressing the metal thin film so that the metal thin film is filled in the grooves to form a metal wire grid structure, the metal wire grid structure comprising the metal layer formed in the grooves and a cladding layer integrated with the metal layer and covering the surface of the template; and moving the metal layer to a substrate to manufacture the metal wire grid polarizer;

wherein moving the metal layer to the substrate comprises:

providing the substrate on the cladding layer and bonding the metal wire grid structure to the substrate;

separating the metal wire grid structure bonded to the substrate from the template; and etching the metal wire grid structure to etch away the cladding layer between the adjacent metal layers and expose a surface of the substrate, to obtain the metal wire grid polarizer.

15. A method for manufacturing a metal wire grid polarizer, comprising:

providing a template having grooves;

forming a metal layer in the grooves by coating a metal thin film on a surface of the template on which the grooves are provided and impressing the metal thin film so that the metal thin film is filled in the grooves to form a metal wire grid structure, the metal wire grid structure comprising the metal layer formed in the grooves and a cladding layer integrated with the metal layer and covering the surface of the template, wherein impressing the metal thin film comprises:

coating an impact-resistance layer on a surface of the metal thin film; and impressing the impact-resistance layer and the metal thin film by using an impressing device so that the metal thin film is filled in the grooves and is formed into the metal wire grid structure; and moving the metal layer to a substrate to manufacture the metal wire grid polarizer, wherein the impressing device is a laser.

16. The method for manufacturing the metal wire grid polarizer according to claim 15, wherein, before providing the substrate on the cladding layer, the method further comprises thinning the cladding layer to make the cladding layer have a target thickness, wherein the target thickness is less than 30 nm.

17. The method for manufacturing the metal wire grid polarizer according to claim 15, wherein coating the metal thin film on the surface of the template on which the grooves are provided comprises:

depositing a release layer on the surface of the template on which the grooves are provided; and coating the metal thin film on the release layer.

18. The method for manufacturing the metal wire grid polarizer according to claim 17, wherein a material of the release layer comprises a metal material or a fluorine-containing organic compound.

19. The method for manufacturing the metal wire grid polarizer according to claim 15, wherein a material of the impact-resistance layer comprises graphite.

20. The method for manufacturing the metal wire grid polarizer according to claim 15, wherein providing the substrate on the cladding layer and bonding the metal wire grid structure to the substrate comprises providing the substrate on the cladding layer and bonding the metal wire grid structure to the substrate by employing a bonding technology.

\* \* \* \* \*